(12) United States Patent
Mulder et al.

(10) Patent No.: US 9,723,945 B2
(45) Date of Patent: Aug. 8, 2017

(54) DEVICE FOR MAKING A BEVERAGE ADAPTED TO ACCURATELY SET A DISPENSE TEMPERATURE OF THE BEVERAGE

(75) Inventors: Bernardo Arnoldus Mulder, Dronrijp (NL); Theodoor Stolk, Langezwaag (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 677 days.

(21) Appl. No.: 13/880,157

(22) PCT Filed: Nov. 15, 2011

(86) PCT No.: PCT/IB2011/055092
§ 371 (c)(1),
(2), (4) Date: Apr. 18, 2013

(87) PCT Pub. No.: WO2012/069958
PCT Pub. Date: May 31, 2012

(65) Prior Publication Data
US 2013/0298776 A1    Nov. 14, 2013

(30) Foreign Application Priority Data
Nov. 26, 2010 (EP) ..................... 10192757

(51) Int. Cl.
A47J 31/40 (2006.01)
A47J 31/46 (2006.01)
A47J 31/54 (2006.01)

(52) U.S. Cl.
CPC ............. *A47J 31/46* (2013.01); *A47J 31/545* (2013.01)

(58) Field of Classification Search
CPC .......... F16K 17/0473; A23F 3/18; A23F 5/26; A23F 5/262; A47J 27/21083; A47J 31/465; A47J 31/467; A47J 31/56
(Continued)

(56) References Cited

U.S. PATENT DOCUMENTS 5,778,765 A    7/1998 Klawuhn
6,205,909 B1    3/2001 Giannelli
(Continued)

FOREIGN PATENT DOCUMENTS

CN    1541076 A    10/2004
CN    1935074 A    3/2007
(Continued)

OTHER PUBLICATIONS

W.O. 2007/093462 A1 Machine Translation (Translated May 21, 2015).*
(Continued)

*Primary Examiner* — Phuong Nguyen (57) ABSTRACT

In a device (1) for making a beverage on the basis of interaction between a beverage extract and an extracting fluid, which comprises an openable and closeable chamber (50) for receiving and accommodating a quantity of the beverage extract, and heating/cooling means (30) for setting the temperature of the extracting fluid, arranged upstream of the chamber (50), a beverage making process can be performed with extracting fluid that is exactly at a desired temperature. During heat-up or cool-down phases of the heating/cooling means (30), the extracting fluid is transported to another position than the chamber (50) where the beverage making process is supposed to take place. For the purpose of determining an appropriate path of the extracting fluid in every possible situation, valve means (60) are
(Continued)

applied, which are switchable under the influence of a change of the flow rate of the extracting fluid.

21 Claims, 2 Drawing Sheets (58) Field of Classification Search
USPC ............ 99/283, 300, 288, 323.3; 137/793.7; 141/82
See application file for complete search history.

(56) References Cited

U.S. PATENT DOCUMENTS

| 7,032,502 | B2 | 4/2006 | Chan et al. |
| 7,415,921 | B2 * | 8/2008 | Brouwer ........................ 99/283 |
| 7,481,151 | B2 * | 1/2009 | Van Der Meer et al. ...... 99/281 |
| 7,565,861 | B2 * | 7/2009 | Blanc ............................ 99/308 |
| 7,673,558 | B2 | 3/2010 | Panesar et al. |
| 7,946,218 | B2 * | 5/2011 | Weijers ......................... 99/300 |
| 8,267,666 | B2 * | 9/2012 | Gruber et al. ................. 417/26 |
| 2005/0160918 | A1 * | 7/2005 | Winstanley et al. ........... 99/279 |
| 2009/0013875 | A1 * | 1/2009 | Widanagamage Don ...... 99/280 |
| 2010/0018402 | A1 | 1/2010 | Liu |
| 2010/0101427 | A1 * | 4/2010 | Mulder .......................... 99/282 |
| 2011/0168027 | A1 * | 7/2011 | Nani .............................. 99/283 |
| 2011/0223309 | A1 * | 9/2011 | Daburger et al. ............. 426/595 |

FOREIGN PATENT DOCUMENTS

| CN | 101317740 A | 12/2008 |
| CN | 101384199 A | 3/2009 |
| EP | 0771542 A1 | 5/1997 |
| EP | 1074210 A1 * | 2/2001 |
| EP | 1584273 A2 | 10/2005 |
| EP | 1882433 A1 | 1/2008 |
| EP | 2070458 A1 | 6/2009 |
| WO | WO 2007093462 A1 * | 8/2007 |
| WO | 2008007306 A1 | 1/2008 |
| WO | 2008041260 A1 | 4/2008 |
| WO | 2008087677 A1 | 7/2008 |
| WO | 2009128110 A1 | 10/2009 |

OTHER PUBLICATIONS

WO 2007/093462 A1 Machine Translation (Translated by Espacenet May 21, 2015).*

* cited by examiner

DEVICE FOR MAKING A BEVERAGE ADAPTED TO ACCURATELY SET A DISPENSE TEMPERATURE OF THE BEVERAGE

FIELD OF THE INVENTION

The present invention relates to a device for making a beverage on the basis of interaction between a beverage extract and an extracting fluid, comprising an openable and closeable chamber for receiving and accommodating a quantity of the beverage extract; and heating/cooling means for setting the temperature of the extracting fluid, arranged upstream of the chamber and connected to the chamber through means for transporting the extracting fluid.

BACKGROUND OF THE INVENTION

In a process of preparing a hot beverage, a temperature of the extracting fluid is an important factor. This is particularly true in the case of a process of preparing coffee on the basis of a quantity of ground coffee beans as the quantity of the beverage extract and water as the extracting fluid. In such a case, in order to have a good extraction of the ground coffee beans, the water that is used in the coffee making process is heated, wherein the temperature of the water is increased such as to be in a predetermined range, for example, a range from 90° C. to 96° C.

Usually, coffee is prepared by using a coffee maker. A specific type of coffee maker is a coffee maker which is suitable for preparing quantities of coffee on the basis of coffee pads, i.e. envelopes filled with a quantity of ground coffee beans, wherein the envelopes are permeable to liquid. In general, such a coffee maker comprises a sealable brew chamber which is adapted to receive one or more coffee pads. During operation of the coffee maker, a quantity of hot water is forced to flow through the at least one coffee pad. In the process, the envelope of the coffee pad acts as a filter. In this way, on the basis of the interaction between the hot water and the coffee pad inside the brew chamber, a desired quantity of coffee is obtained.

A coffee maker as mentioned in the preceding paragraph is known from EP 0 771 542. For the purpose of heating water to a predetermined temperature, the known coffee maker comprises a heat exchanger having an electric resistor. During operation, water is instantly heated to the predetermined temperature while flowing through this heat exchanger. An electric pump is provided for realizing flows of water through the coffee maker, which are necessary in a process of making coffee. In order to accurately control the operation of the electric resistor of the heat exchanger and the operation of the pump, such that a predetermined temperature of water is obtained, the coffee maker comprises a temperature sensor for detecting the temperature reached by the water after having been heated by the heat exchanger and a control device which processes the signals received from the temperature sensor. Furthermore, a water delivery counter means is provided for measuring a quantity of water transferred to the brew chamber, and the control device is adapted to process simultaneously signals received from the temperature sensor and from the water delivery counter means. The signal received from the water delivery counter means is also suitable to be used for the purpose of controlling the quantity of coffee to be made. In the coffee maker known from EP 0 771 542, when it appears that water exiting the heat exchanger is at a temperature lower than the predetermined temperature, the pump delivery is reduced or interrupted until the water exiting the heat exchanger has recovered the predetermined temperature.

SUMMARY OF THE INVENTION

On the one hand, the above-described known application of a control device, a temperature sensor and water delivery counter means for the purpose of controlling the operation of heating means and a pump of a beverage maker may yield reasonable results as far as realizing a predetermined dispense temperature of the beverage is concerned, but, on the other hand, the application of these components causes a cost price of the beverage maker to be relatively high. Furthermore, a user of the beverage maker may doubt the proper operation thereof when the pump is operated with alternating low deliveries and high deliveries, or even interruptions, according to a random pattern which can be different for each use. Also, the use of water that is actually too cold in a coffee making process needs to be compensated for in some way, even though the use is limited on the basis of the adjustment of the operation of the pump. This limits the possibilities of temperature settings, and may even have a negative influence on the coffee brewing process and, as a consequence, the taste of the coffee that is obtained.

It is an object of the present invention to provide a beverage maker which can do without expensive components, and which can set the temperature of dispensed beverage in a more accurate fashion than the coffee maker known from EP 0 771 542. The object is achieved by a beverage maker comprising a chamber and heating/cooling means as mentioned in the opening paragraph; and further comprising valve means for determining a path followed by the extracting fluid through the device, which are arranged at a position between the heating/cooling means and the chamber, and which are adapted to allow passage of the extracting fluid from the heating/cooling means to one of the chamber and another position than the chamber, and to block passage of the extracting fluid from the heating/cooling means to another of the chamber and the other position than the chamber, wherein the valve means are passive valve means which are switchable under the influence of a change of pressure build-up in the device caused by a change of a flow rate of the extracting fluid; and an arrangement for setting the flow rate of the extracting fluid, which comprises the following components: pumping means for realizing a flow of the extracting fluid by exerting pressure on the extracting fluid; means for measuring the temperature of the extracting fluid at a position between the heating/cooling means and the valve means; and controlling means for controlling the operation of the pumping means on the basis of results of the temperature measurements, wherein the controlling means are adapted to operate the pumping means at another pressure in case the temperature of the extracting fluid is inside a predetermined range of temperatures at which the extracting fluid is suitable to be used in the beverage making process than in case the temperature of the extracting fluid is outside of that range, and wherein the pressures in the two cases are significantly different.

According to the present invention, valve means are applied in a beverage maker, which offers the possibility of conducting the extracting fluid along different paths through the beverage maker, wherein one of the paths is a path from the heating/cooling means towards the chamber, and wherein another of the paths is an alternative to that path, so that it is achieved that not all of the extracting fluid needs to flow to the chamber. By having the alternative path, it is possible to realize a way of operating the beverage maker according to which the extracting fluid is only transported to the chamber when the extracting fluid is at a correct temperature for use in a beverage making process, and is transported to another position when the temperature is outside of a predetermined range of correct temperatures and/or when there is a need for having a flow of fluid through the beverage maker apart from a beverage making process.

Within the scope of the present invention, it is possible that the valve means are adapted to switch to a position for allowing passage of the extracting fluid from the heating/cooling means to the chamber and blocking passage of the extracting fluid from the heating/cooling means to the other position than the chamber when the flow rate is increased from below a predetermined switching point of the valve means to above the switching point, and to switch to a position for allowing passage of the extracting fluid from the heating/cooling means to the other position than the chamber and blocking passage of the extracting fluid from the heating/cooling means to the chamber when the flow rate is decreased from above the predetermined switching point to below the switching point. With this design of the valve means, it is achieved that a flow of the extracting fluid to the chamber can take place at a highest rate.

When the heating/cooling means comprise a so-called flow through heater, i.e. a component for instantly heating fluid flowing there through, advantageous effects of the application of the valve means are found when the start-up phase and the cool-down phase are taken into consideration. The flow rate of the extracting fluid can initially be set at a relatively low value, in particular a value below the switching point of the valve means. Throughout the start-up phase of the flow through heater, the flow rate can be kept at the relatively low value, as a result of which the extracting fluid, which is too cold to be used in a beverage making process, is transported to another position than the chamber where the beverage making process is supposed to take place. As an advantageous consequence, the beverage making process is not influenced by relatively low temperatures of the extracting fluid during the start-up phase.

Once the flow through heater is in the correct operative state, which is the case when it is capable of heating the extracting fluid to a predetermined temperature related to a proper way of carrying out a beverage making process in the chamber, the flow rate can be increased. When the flow rate exceeds the switching point of the valve means, the path to the chamber is opened, while the path to the other position than the chamber is closed. In this way, it is achieved that the beverage making process takes place by using extracting fluid which is at the right temperature. The quality of the beverage which is eventually dispensed from the beverage maker can be optimal, due to the appropriate temperature of the extracting fluid.

At the end of each beverage making process, it is best for the flow through heater not to be immediately shut down, as in that case, it is to be expected that the flow through heater will steam itself empty under the influence of thermal energy still present in the flow through heater. Therefore, it is advantageous if the flow of extracting fluid is continued for a while after the beverage making process has taken place. In that cool-down phase, the flow rate of the extracting fluid can be relatively low. During the decrease of the flow rate, the switching point of the valve means is reached, and the valve means switches back to the position in which the extracting fluid is only allowed to flow to another position than the chamber, so that there is no influence of this cooling flow of extracting fluid on the beverage making side of the beverage maker whatsoever.

All in all, when the present invention is applied, it is achieved that a beverage making process can be performed with extracting fluid that is exactly at a desired temperature. During heat-up or cool-down phases of the heating/cooling means, the extracting fluid is transported to another position than the chamber where the beverage making process is supposed to take place. For the purpose of determining an appropriate path of the extracting fluid in every possible situation, valve means are applied, which are switchable under the influence of a change of the flow rate of the extracting fluid. Since it is possible to choose and set an appropriate value of the flow rate for every temperature of the extracting fluid, a correct position of the valve means can be guaranteed for every possible situation. The value of the flow rate can be controlled directly in dependency of the temperature, as is the case when the present invention is applied, but that does not alter the fact that other options exist in practice, for example, controlling the flow rate on the basis of time, or on the basis of a total of a displaced volume of the extracting fluid. However, these options may be less accurate, wherein it may happen that the correct final temperature of the beverage is not obtained.

The present invention is applicable with any type of cooling/heating means, wherein these means may even have a high thermal mass, as an influence of the start-up phase and cool-down phase on a beverage making process can be eliminated, as explained in the foregoing.

It follows from the foregoing that switching of the valve means is flow controlled, in other words, a change of the flow rate of the extracting fluid, during which a switching point of the valve means is passed, causes the valve means to switch. Within the scope of the present invention, the valve means are of a passive nature, which is advantageous in view of the costs and the reliability, and the flow rate of the extracting fluid which determines the switching of the valve means is the actual flow rate of the extracting fluid as supplied to the valve means. In particular, the valve means are passive valve means which are switchable under the influence of a change of pressure build-up in the device caused by a change of a flow rate of the extracting fluid. When the flow rate of the extracting fluid increases, pressure is built up in the chamber, and this can cause the valve means to switch when they are still in the position associated with a lower flow rate below the switching point. Also, when the flow rate of the extracting fluid is decreased, pressure is relieved, and this can cause the valve means to switch when they are still in the position associated with a higher flow rate above the switching point.

In particular, the device according to the present invention comprises an arrangement for setting the flow rate of the extracting fluid, which comprises the following components: pumping means for realizing a flow of the extracting fluid by exerting pressure on the extracting fluid; means for measuring the temperature of the extracting fluid at a position between the heating/cooling means and the valve means; and controlling means for controlling the operation of the pumping means on the basis of results of the temperature measurements, wherein the controlling means are adapted to operate the pumping means at another pressure in case the temperature of the extracting fluid is inside a predetermined range of temperatures at which the extracting fluid is suitable to be used in the beverage making process than in case the temperature of the extracting fluid is outside of that range, and wherein the pressures in the two cases are significantly different.

By measuring the temperature of the extracting fluid, and having controlling means which are capable of processing the results of the temperature measurements and controlling the operation of pumping means for realizing the flow of extracting fluid, it is possible to realize a desired relation between the temperature of the extracting fluid and the flow rate of the extracting fluid. In particular, it is possible to control the flow rate in such a way that the flow rate is kept relatively low when the temperature of the extracting fluid appears to be outside of the range associated with the beverage making process, and that the flow rate is kept relatively high when the temperature of the extracting fluid appears to be inside the range, or the other way around. During transitions from one condition to another, i.e. from one rate to another rate and vice versa, the appropriate switching of the valve means can take place, so that the appropriate path for the extracting fluid through the device, i.e. towards the chamber, or towards another position, is determined.

The controlling means can be adapted to operate the pumping means at a significantly higher pressure in case the temperature of the extracting fluid is inside a predetermined range of temperatures at which the extracting fluid is suitable to be used in the beverage making process than in case the temperature of the extracting fluid is outside of that range. In that way, it is achieved that the flow rate of the extracting fluid is highest when the temperature of the extracting fluid is acceptable for the beverage making process, which has the advantage of realizing a period of beverage making which is as short as possible It is possible that an open loop control is applied to the operation of the pumping means. However, it is also possible that means for measuring an actual value of the flow rate of the extracting fluid are provided, wherein the controlling means are adapted to compare the actual value of the flow rate to a flow rate which is intended to be realized on the basis of the outcome of the temperature measurements, and to adjust the operation of the pumping means in case a deviation is found.

In case controlling means as described in the foregoing are used, it is a practical option for these means to be adapted to control the operation of the pumping means in order to set one of two predetermined values of the flow rate of the extracting fluid, wherein one of the predetermined values of the flow rate of the extracting fluid is above the predetermined switching point of the valve means, and is applicable to temperatures of the extracting fluid which are inside the predetermined range of temperatures at which the extracting fluid is suitable to be used in the beverage making process, and wherein another of the predetermined values of the flow rate of the extracting fluid is below the predetermined switching point of the valve means, and is applicable to temperatures of the extracting fluid which are outside of that range. When there are only two possible values of the flow rate to be set, the controlling means can be kept as simple as possible. For sake of completeness, it is noted that the controlling means may as well be adapted to set the low flow rate when the temperature of the extracting fluid is acceptable for making the beverage, and to set the high flow rate when the temperature is too low or too high, i.e. outside of an acceptable range of temperatures.

In many cases, for example in case the device according to the present invention is a coffee maker, the heating/cooling means are adapted to be used for increasing the temperature of the extracting fluid, i.e. for heating the extracting fluid. In those cases, a beverage making process requires a relatively high temperature of the extracting fluid, and therefore, in those cases, the controlling means should be adapted to operate the pumping means at another pressure in case the temperature of the extracting fluid is higher than a predetermined value than in case the temperature of the extracting fluid is lower than that value.

The other position than the chamber, which is the destination of the extracting fluid when the path to the chamber is blocked by the valve means, can be a reservoir for containing a quantity of the extracting fluid. Alternatively, this position can be another type of reservoir, particularly a reservoir used for receiving waste fluid, a position upstream of the heating/cooling means, or means for supplying fluid to a device for generating steam, for example. In the latter case, the device according to the present invention can be used for delivering steam besides a beverage, wherein a switch between the two functions of the beverage maker is realized by causing the valve means of the device to switch.

When the other position than the chamber is a reservoir as mentioned, a feedback of extracting fluid is realized as long as the valve means are in the position for not allowing a flow to the chamber, but only allowing a flow to the reservoir. The device may comprise a suitable tube or the like for connecting the valve means to the reservoir. When there is no flow of extracting fluid through that tube, it is possible that this tube is used as an air inlet, on the basis of which extracting fluid and/or beverage are prevented from being sucked back from the chamber side of the device.

In a preferred embodiment of the device according to the present invention, the valve means is arranged directly at an inlet of the chamber. In this way, a situation in which a quantity of extracting fluid might stay behind between the valve means and the chamber after the device has been operated, and which is then transported to the chamber during the next operation of the device, is avoided. It is clearly understood that the use of "old" fluid can be dangerous, as such fluid can be a source of bacteria.

The present invention can involve another useful aspect, namely pre-heating of the chamber, which may be desirable in cases of making small quantities of coffee such as espresso. For example, it may be so that the heating/cooling means and the valve means are interconnected through suitable means for transporting the extracting fluid from the heating/cooling means to the valve means, wherein these transporting means are associated with the chamber in order to enable extracting fluid passing through these transporting means to influence the temperature of the chamber. Alternatively, it may be so that the valve means and the other position than the chamber are interconnected through suitable means for transporting the extracting fluid from the valve means to the other position than the chamber, wherein these transporting means are associated with the chamber in order to enable extracting fluid passing through these transporting means to influence the temperature of the chamber. In any case, tubes or the like for transporting the extracting fluid may be connected to a wall of the chamber, may be made to surround the chamber, etc., so that the chamber is pre-heated as soon as there is a flow of extracting fluid through the tubes and the heating/cooling means are operated such as to heat the extracting fluid.

The above-described and other aspects of the present invention will be apparent from and elucidated with reference to the following detailed description of a beverage maker comprising a flow-controlled three-way valve.

BRIEF DESCRIPTION OF THE DRAWINGS

The present invention will now be explained in greater detail with reference to the figures, in which equal or similar parts are indicated by the same reference signs, and in which.

In the figures, a direction of a flow of water is indicated by means of arrows.

DETAILED DESCRIPTION OF EMBODIMENTS

Figure 1:
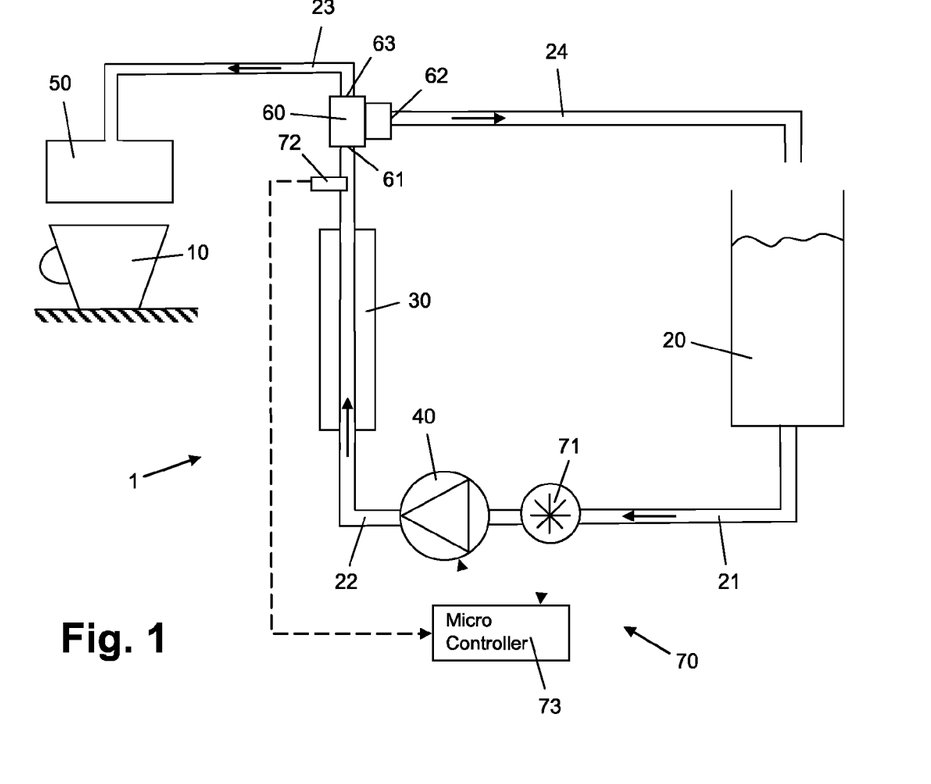
FIG. 1 diagrammatically shows components and a control circuit of a beverage maker according to a preferred embodiment of the present invention.

FIG. 1 diagrammatically shows components 20, 30, 40, 50, 60 and a control circuit 70 of a beverage maker 1 according to a preferred embodiment of the present invention. In particular, this beverage maker 1 is suitable for making coffee on the basis of hot water and at least one coffee pad (not shown) filled with ground coffee beans, which does not alter the fact that the beverage maker 1 may just as well be suitable for preparing other hot drinks Besides the components 20, 30, 40, 50, 60 and the control circuit 70 of the beverage maker 1, FIG. 1 also shows a receptacle 10 such as a cup for receiving the coffee from the beverage maker 1.

The beverage maker 1 comprises a water reservoir 20 for containing water, a flow through heater 30 for supplying heat to the water, an electric pump 40 for pumping water from the water reservoir 20 to the flow through heater 30 and beyond, and a sealable brew chamber 50 for receiving and accommodating one or more coffee pads. It is noted that the present invention is also applicable in coffee makers making use of fresh coffee beans that are grinded by the coffee makers itself. These coffee makers sometimes are referred to as fully automatic coffee machines.

At an outlet side of the flow through heater 30, a three-way valve 60 is arranged, which comprises an inlet 61, a first outlet 62 and a second outlet 63. The first outlet 62 serves for returning water to the water reservoir 20, whereas the second outlet 63 serves for supplying water to the brew chamber 50.

The various components 20, 30, 40, 50, 60 are interconnected through tubes 21, 22, 23, 24 for transporting water. As seen in a direction downstream of the water reservoir 20, there is a tube 21 extending between the water reservoir 20 and the pump 40, there is a tube 22 extending between the pump 40 and the inlet 61 of the three-way valve 60, which is also extending through the flow through heater 30, and there is a tube 23 extending between the second outlet 63 of the three-way valve 60 and the brew chamber 50. Also, there is a tube 24 extending from the first outlet 62 of the three-way valve 60 to the water reservoir 20.

The control circuit 70 of the beverage maker 1 serves for controlling the operation of the pump 40, whereby the position of the three-way valve 60 is controlled in an indirect manner as well, as will be explained later.

The control circuit 70 comprises two components 71, 72 for performing measurements during operation of the beverage maker 1, namely a flow sensor 71 which, in the shown example, is arranged in the tube 21 extending between the water reservoir 20 and the pump 40, and a temperature sensor 72 which is arranged at a position between the flow through heater 30 and the inlet 61 of the three-way valve 60. Furthermore, the control circuit 70 comprises a micro controller 73 for processing the results of the measurements performed by the flow sensor 71 and the temperature sensor 72 during operation of the beverage maker 1, and for setting operation parameters of the pump 40. According to a practical option, the micro controller 73 is adapted to control the power supply to the pump 40. In FIG. 1, control signals are represented by dashed arrows.

When a user desires to make a quantity of coffee by using the beverage maker 1, the user inserts at least one coffee pad into the brew chamber 50, and activates the beverage maker 1. Naturally, the water reservoir 20 should be filled, at least to a certain extent, so that there is enough water for making the coffee.

The micro controller 73 is adapted to follow the following algorithm during operation of the beverage maker 1.

In a first stage, the flow through heater 30 heats up, and is not yet capable of heating the water to a desired temperature. Still, the pump 40 is activated. In particular, the pump 40 is activated to realize a water flow at a relatively low rate, for example, 1 ml/s. The actual flow rate is measured by the flow sensor 71. If the actual flow rate appears to deviate from the flow rate which is intended to be set, i.e. the predetermined flow rate, the micro controller 73 adjusts operation parameters of the pump 40 in order to reach the predetermined flow rate. There is a continuous process of checking the actual flow rate and adjusting the operation of the pump 40. Furthermore, there is a continuous process of checking the temperature of the water exiting the flow through heater 30, which is performed by using the temperature sensor 72. As long as the temperature appears to be below a predetermined value, namely a value associated with a condition of the water in which it is suitable to be used for the coffee making process, the relatively low flow rate of the water is maintained. Under the influence of the relatively low flow rate, the three-way valve 60 is in a position for allowing passage to the tube 24 for transporting the water to the water reservoir 20 and blocking passage to the tube 23 for transporting the water to the brew chamber 50. Hence, in the first stage, there is a feedback of water to the water reservoir 20 while the flow through heater 30 heats up.

As soon as the temperature sensor 72 indicates that the temperature of the water has reached the predetermined temperature, the micro controller 73 activates the pump 40 to realize a water flow at a relatively high rate, for example, 5 ml/s. With the setting of this high flow rate, a second stage starts, in which the flow through heater 30 is fully heated up and capable of heating the water to the desired extent. During the second stage, any deviations between the actual flow rate and the predetermined flow rate are found by means of the flow sensor 71, and are accounted for by adjustments of the operation of the pump 40 by means of the micro controller 73, as is the case in the first stage.

The three-way valve 60 is switchable under the influence of a change of the flow rate of the water, wherein a switching point of the three-way valve 60 is chosen such as to be between the low value of the flow rate and the high value of the flow rate. Therefore, when the flow rate is changed from the low value to the high value, the position of the three-way valve 60 is changed as well. A default position of the three-way valve 60, associated with a low flow rate and low pressures in the beverage maker 1, is a position in which the passage to the brew chamber 50 is blocked and the passage to the water reservoir 20 is open. This is the position of the three-way valve 60 during the first stage. Another possible position, i.e. a position in which the passage to the brew chamber 50 is open and the passage to the water reservoir 20 is blocked, is assumed by the three-way valve 60 in the second stage. It follows from the foregoing that this position is associated with a high flow rate and high pressures in the beverage maker 1.

During the second stage, the three-way valve 60 allows the water to flow to the brew chamber 50, so that the coffee making process can be carried out. The flow through heater 30 is operating in a predetermined manner, such as to transfer a predetermined quantity of heat to the water passing there through at the high flow rate. Hence, during the second stage, the coffee making process is performed with all predetermined requirements.

The second stage lasts as long as necessary to make a desired quantity of coffee. The duration of the second stage may be determined in any suitable manner known per se. The second stage may be followed by a third stage, namely a stage in which the flow through heater 30 cools down while the pump 40 is still operated and, as a consequence, water is still made to flow through the beverage maker 1. The third stage is comparable to the first stage as far as the flow rate of the water is concerned, and the path followed by the water. The transition of the second stage to the third stage involves a decrease of the flow rate of the water, as a result of which the three-way valve 60 switches and assumes a position for feeding water back to the water reservoir 20 again. Hence, in the third stage, the flow through heater 30 is allowed to cool down without impacting on the actual coffee making side of the beverage maker 1, i.e. the side where the brew chamber 50 is located. The third stage can be necessary in order to avoid that the flow through heater 30 steams itself empty, which may occur if the operation of the beverage maker 1 would directly be terminated as soon as the coffee is ready.

On the basis of the algorithm as described in the foregoing, it is achieved that the temperature of the coffee can be accurately set, since the water is only allowed to flow to the brew chamber 50 when the flow through heater 30 is in a predetermined condition, wherein the water is heated up to a predetermined temperature after having passed the flow through heater 30. During stages in which the flow through heater 30 heats up and cools down, there is also a flow of water, but this flow is directed back to the water reservoir 20, and cannot reach the brew chamber 50. This is achieved through the application of a three-way valve 60 which is switchable under the influence of a change of the flow rate of the water. By having an appropriate control circuit 70, it can be achieved that the flow rate is determined on the basis of the temperature of water exiting the flow through heater 30. Hence, a change of the flow rate can be realized in dependence of the temperature, so that a desired path of the water through the beverage maker 1 can easily be realized for both the situation in which the water has a temperature that is appropriate for a coffee making process, and the situation in which this is not the case.

The three-way valve 60 is adapted to react to a change of the flow rate. Therefore, it does not matter if a high flow rate is associated with a correct temperature of the water, as is the case in the above-described example, or a low flow rate, as both options allow for a change from one flow rate to another, wherein a switching point of the three-way valve 60 can be passed. Naturally, the switching point of the three-way valve 60 is between the different values of the flow rate. In other words, the different values of the flow rate are chosen such as to be on either side of the switching point of the three-way valve 60.

Figure 2:
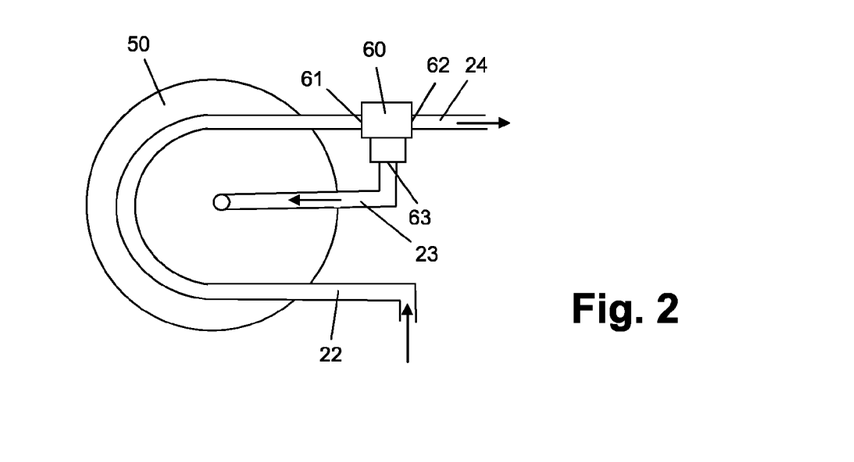
FIG. 2 illustrates how a tube for transporting water can be associated with a brew chamber of the beverage maker.

FIG. 2 illustrates a possibility existing within the scope of the present invention. In some cases, for example, cases of making espresso by means of the beverage maker 1, it is advantageous if the brew chamber 50 is pre-heated. Instead of using separate heating means at the brew chamber 50 and raising the energy consumption of the beverage maker 1 in doing so, it is possible to use the heat of the water. FIG. 2 shows that a portion of the tube 22 extending between the pump 40 and the inlet 61 of the three-way valve 60, namely a portion downstream of the flow through heater 30, may be shaped and positioned such as to contact a wall of the brew chamber 50, or at least be at only a small distance from the wall of the brew chamber 50, so that heat transfer from the water flowing through the tube 22 to the brew chamber 50 can take place. In FIG. 2, a top view of the brew chamber 50 is shown, wherein the tube 22 is extending at the top side of the brew chamber 50, which does not alter the fact that another positioning of the tube 22 with respect to the brew chamber 50 is possible within the scope of the present invention.

An alternative possibility (not shown) is that the tube 24 extending from the first outlet 62 of the three-way valve 60 to the water reservoir 20 is associated with the brew chamber 50. In such a case, the pre-heating takes place during the first stage of the operation of the beverage maker 1, and is terminated when the second stage starts and the actual coffee making process is performed, as in that stage, there is no longer a flow of water through the tube 24 as mentioned. The termination of the pre-heating is not a problem since the brew chamber 50 can do without additional heating as soon as it directly receives a supply of hot water.

Figure 3:
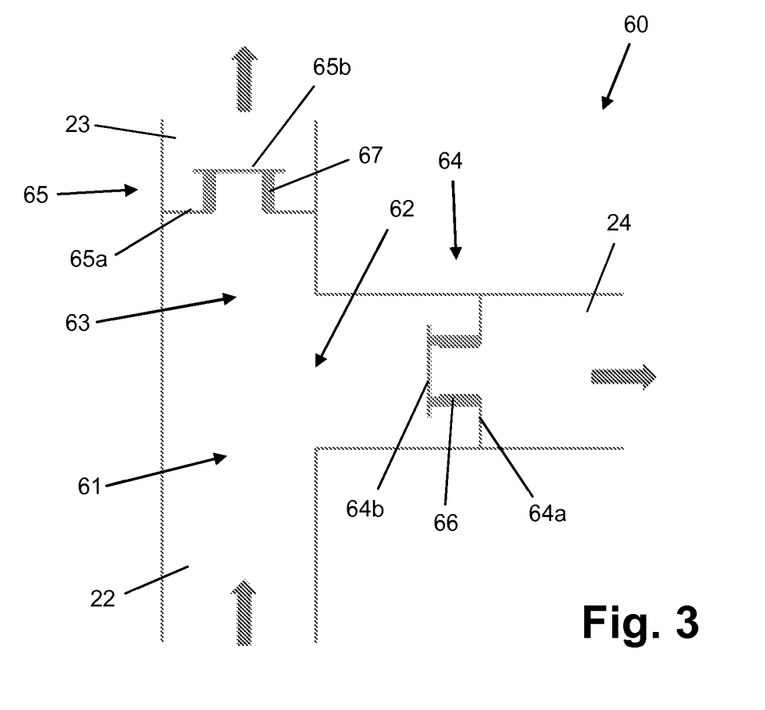
FIG. 3 diagrammatically shows a possible layout of a three-way valve which is part of the beverage maker.

FIG. 3 illustrates how the three-way valve 60 may be designed in practice. For sake of completeness, it is noted that the following description of the three-way valve 60 relates to the example as shown, which is feasible within the scope of the present invention as one of various possibilities.

In the shown example, in both outlets 62, 63 of the valve 60, switching components 64, 65 are arranged, which can be in an opened state, i.e. a state for allowing fluid to pass, or a closed state, i.e. a state for blocking a flow of fluid. Each of the switching components 64, 65 is equipped with an elastic element 66, 67 such as a spring for determining a default state of the component 64, 65, which can be an opened state or a closed state, and for determining a threshold for switching from the default state to the other possible state, and vice versa.

For example, a switching component 64 in the first outlet 62, i.e. the outlet 62 for enabling transport of the fluid to another position than the brew chamber 50, may be designed such as to be in an opened state in a default situation, i.e. a situation in which the component 64 is not subjected to a pressure. The elastic element 66 may be designed such as to keep at least two parts 64a, 64b of the switching component 64 at a distance from each other. When pressure is exerted, the elastic element 66 is compressed, and at a certain point, it is achieved that the parts 64a, 64b contact each other. At that point, the switching component 64 is in the closed state, and remains in that state until the pressure is decreased and the elastic element 66 is capable of pressing the parts 64a, 64b apart again on the basis of the fact that the spring force is no longer exceeded by the pressure.

Furthermore, a switching component 65 in the second outlet 63, i.e. the outlet 63 for enabling transport of the fluid to the brew chamber 50, may be designed such as to be in a closed state in a default situation. The elastic element 67 may be designed such as to pull at least two parts 65a, 65b of the switching component 65 together and let these parts 65a, 65b contact each other. When pressure is exerted, the force exerted by the elastic element 67 is counteracted, and at a certain point, it is achieved that the elastic element 67 is extended and the parts 65a, 65b are moved away from each other. At that point, the switching component 65 is in the opened state, and remains in that state until the pressure is decreased and the elastic element 67 is capable of pulling the parts 65a, 65b together again on the basis of the fact that the spring force is no longer exceeded by the pressure.

The thresholds of the pressure for switching the switching components 64, 65 do not need to be equal. For example, the switching component 64 associated with the first outlet 62 may be adapted to switch at a lower pressure than the switching component 65 associated with the second outlet 63. In that case, in a situation in which both switching components 64, 65 are in their default state and pressure is built up, the switching component 64 associated with the first outlet 62 switches first. As a result, both switching components 64, 65 are in the closed state for a short while, wherein the switching component 65 associated with the second outlet 63 switches as soon as the threshold for changing the state of this component 65 from the closed state to the opened state is reached. When the pressure is decreased, the switching component 65 associated with the second outlet 63 switches back to the closed position at a certain point, and the switching component 64 associated with the first outlet 62 switches back to the opened position soon afterwards. Examples of threshold values which are suitable in the beverage maker 1 as described on the basis of FIG. 1 are 0.25 bar for the switching component 64 associated with the first outlet 62, and 0.5 bar for the switching component 65 associated with the second outlet 63.

It will be clear to a person skilled in the art that the scope of the present invention is not limited to the examples discussed in the foregoing, but that several amendments and modifications thereof are possible without deviating from the scope of the present invention as defined in the attached claims. While the present invention has been illustrated and described in detail in the figures and the description, such illustration and description are to be considered illustrative or exemplary only, and not restrictive. The present invention is not limited to the disclosed embodiments.

Variations to the disclosed embodiments can be understood and effected by a person skilled in the art in practicing the claimed invention, from a study of the figures, the description and the attached claims. In the claims, the word "comprising" does not exclude other steps or elements, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the present invention.

The application of the present invention is not limited to devices comprising a flow through heater. It is also possible to have flow-controlled valve means 60 in a device comprising a boiler, for example, and achieve an accurate setting of the dispense temperature of the beverage. It is noted that flow through heaters are known per se, and are therefore not further elucidated in this text. Furthermore, within the scope of the present invention, any suitable type of pumping means known per se can be applied for pumping fluid through the device.

The present invention can be used in any device in which there is a need for directing water or another fluid to different positions under different circumstances. In case the device is a device for making a beverage, it does not matter whether the device is adapted to dispense a hot beverage or a cold beverage. In both cases, there are means for setting the temperature of the fluid, wherein it takes time for these means to reach a predetermined heat condition, and wherein it is useful to block a flow of fluid to a chamber where the actual beverage making process is supposed to take place and transport the fluid to another position as long as the means are still heating up or cooling down.

Examples of devices in which the flow-controlled valve means 60 can be used are coffee makers, baby milk machines, and water delivery devices. In the latter case, the devices are adapted to let water circulate through a filter and/or an ultraviolet section in order to get rid of bacteria and/or dirt at a low flow rate. As soon as the water is cleaned, it can be let out for further use, at a high flow rate. As noted before, the low flow rate and the high flow rate can be swapped. It is only important that a change of the flow rate can take place.

In a general sense, the present invention relates to a device 1 for dispensing fluid, comprising a system 21, 22, 23, 24 for transporting fluid through the device 1, which has at least two branches 23, 24 leading to different positions 20, 50, and further comprising valve means 60 for determining a path followed by the fluid through the transporting system 21, 22, 23, 24, which are arranged at a position upstream of the branches 23, 24, and which are adapted to allow passage of the fluid to one of the branches 23, 24, and to block passage of the fluid to another of the branches 23, 24, wherein the valve means 60 are switchable under the influence of a change of a flow rate of the fluid.

The present invention can be summarized as follows. In a device 1 for making a beverage on the basis of interaction between a beverage extract and an extracting fluid, which comprises an openable and closeable chamber 50 for receiving and accommodating a quantity of the beverage extract, and heating/cooling means 30 for setting the temperature of the extracting fluid, arranged upstream of the chamber 50 and connected to the chamber 50 through means 22, 23 for transporting the extracting fluid, a beverage making process can be performed with extracting fluid that is exactly at a desired temperature. During heat-up or cool-down phases of the heating/cooling means 30, the extracting fluid is transported to another position 20 than the chamber 50 where the beverage making process is supposed to take place. For the purpose of determining an appropriate path of the extracting fluid in every possible situation, valve means 60 are applied, which are switchable under the influence of a change of the flow rate of the extracting fluid. Since the value of the flow rate can be related to the temperature of the extracting fluid, a correct position of the valve means 60 can be guaranteed for every possible situation.

The invention claimed is:

1. An apparatus for making a beverage by interaction between a beverage extract and an extracting fluid, said apparatus comprising:
   an openable and closable chamber for receiving a quantity of the beverage extract;
   a heat exchanger arranged upstream of the chamber for establishing a predetermined temperature of the extracting fluid;
   a valve arrangement including:
      an inlet operably connected to the heat exchanger for receiving the extracting fluid;
      a first outlet operably connected to a first pathway for diverting received extracting fluid away from the chamber;
      a second outlet operably connected to a second pathway for delivering received extracting fluid to the chamber;
      a pressure-sensitive valve assembly for enabling passage of fluid from the inlet and through the first outlet only when the pressure of the received fluid is within a first predetermined range, and for enabling passage of fluid from the inlet and through the second outlet only when the pressure of the received fluid is within a second predetermined range different from the first predetermined range;

a pump operably connected to the heat exchanger for supplying the extracting fluid to the valve arrangement;

a temperature sensor disposed for measuring the temperature of the extracting fluid at a position along a flow path between the heat exchanger and the valve arrangement; and a controller operably connected to the temperature sensor and to the pump for controlling pressure exerted by the extracting fluid on the pressure-sensitive valve assembly in dependence on the measured temperature of said extracting fluid, said controller, during the making of the beverage, being adapted to:

when the measured temperature is in a predetermined range of temperatures that is not suitable for making the beverage by said interaction, activate the pump to realize a low flow rate of the extracting fluid to effect production on the pressure-sensitive valve assembly of a first pressure within the first predetermined range, thereby diverting extracting fluid away from the chamber; and when the measured temperature is in a predetermined range of temperatures that is suitable for making the beverage by said interaction, activate the pump to realize a high flow rate of the extracting fluid to effect production on the pressure-sensitive valve assembly of a second pressure within the second predetermined range, thereby delivering extracting fluid to the chamber, wherein the high flow rate is higher than the low flow rate.

2. The apparatus according to claim 1 where the second pressure within the second predetermined range for enabling passage of fluid through the second outlet is higher than the first pressure within the first predetermined range.

3. The apparatus according to claim 1 and comprising a flow rate sensor disposed in said apparatus for measuring the flow rate of the extracting fluid entering the valve arrangement said controller being operably connected to said flow rate sensor and being adapted to compare said measured flow rate with a flow rate which is required to effect production by the extracting fluid on the pressure-sensitive valve assembly in accordance with the measured temperature, and to adjust the operation of the pump to achieve said required flow rate.

4. The apparatus according to claim 1 where the pressure-sensitive valve assembly is adapted to:

switch to a second state for enabling passage of the extracting fluid through the second outlet to the chamber and for blocking passage of the extracting fluid through the first outlet to the first pathway when the pressure of the received extracting fluid is increased from below a predetermined switching point of the pressure-sensitive valve assembly to above the switching point; and switch to a first state for enabling passage of the extracting fluid through the first outlet to the first pathway and blocking passage of the extracting fluid through the second outlet to the chamber when the pressure of the received extracting fluid is decreased from above said predetermined switching point to below said predetermined switching point.

5. The apparatus according to claim 1 where the controller is adapted to control the operation of the pump in order to establish:

a first predetermined flow rate of the extracting fluid entering the valve arrangement that effects said production on the pressure-sensitive valve assembly of said first pressure when the measured temperature is in the predetermined range of temperatures that is not suitable for making the beverage by said interaction; and a second predetermined flow rate of the extracting fluid entering the valve arrangement that effects said production on the pressure-sensitive valve assembly of a second pressure when the measured temperature is in a predetermined range of temperatures that is suitable for making the beverage by said interaction.

6. The apparatus according to claim 1 where the heat exchanger is adapted to increase the temperature of the extracting fluid.

7. The apparatus according to claim 6 where the heat exchanger comprises a flow through heater.

8. The apparatus according to claim 1 and comprising a reservoir operably connected to the first outlet of the valve arrangement for receiving at least a quantity of the diverted extracting fluid.

9. The apparatus according to claim 8 where the reservoir is operably connected to the pump for supplying diverted extracting fluid to the heat exchanger.

10. The apparatus according to claim 1 where the valve arrangement is operably connected directly to an inlet of the chamber.

11. The apparatus according to claim 1 where the heat exchanger, the second outlet of the valve arrangement and the chamber are serially connected by a conduit to provide a continuous pathway for the extracting fluid.

12. The apparatus according to claim 11 where the first outlet of the valve arrangement is operably connected to an inlet of the heat exchanger to return diverted extracting fluid to the inlet of the valve arrangement.

13. The apparatus as in claim 1 where the pressure-sensitive valve assembly comprises:

a first pressure sensitive valve disposed in the first outlet; and a second pressure-sensitive valve disposed in the second outlet.

14. The apparatus of claim 1, wherein the controller is configured to adjust operation of the pump to maintained a desired flow rate.

15. The apparatus of claim 1, further comprising a flow rate sensor configured to measure an actual flow rate of the extracting fluid, wherein the controller is configured to adjust operation of the pump to maintain a desired flow rate based on a comparison of the measured actual flow rate with the desired flow rate.

16. The apparatus of claim 1, wherein the first outlet is kept open at a default position of the pressure-sensitive valve assembly by a first elastic element and the second outlet kept closed at the default position by a second elastic element.

17. The apparatus of claim 1, wherein the first outlet is open and the second outlet is closed at a default position of the pressure-sensitive valve assembly.

18. An apparatus for making a beverage by interaction between a beverage extract and an extracting fluid, the apparatus comprising:

a chamber configured to receive a quantity of the beverage extract;

a heater arranged upstream of the chamber and configured to establish a predetermined temperature of the extracting fluid;

a valve arrangement including:
  an inlet operably connected to the heat exchanger and configured to receive the extracting fluid;
  a first outlet operably connected to a first pathway and configured to deliver received extracting fluid to a part other than the chamber;
  a second outlet operably connected to a second pathway and configured to deliver received extracting fluid to the chamber;
  a pressure-sensitive valve assembly configured to enable passage of fluid from the inlet and through the first outlet only when the pressure of the received fluid is within a first predetermined range, and configured to enable passage of fluid from the inlet and through the second outlet only when the pressure of the received fluid is within a second predetermined range different from the first predetermined range;
a pump operably connected to the heat exchanger and configured to supply the extracting fluid to the valve arrangement;
a temperature sensor configured to measure temperature of the extracting fluid at a position along a flow path between the heat exchanger and the valve arrangement; and
a controller operably connected to the temperature sensor and to the pump and configured to control pressure exerted by the extracting fluid on the pressure-sensitive valve assembly in dependence on the measured temperature of the extracting fluid, the controller being further configured to:
  when the measured temperature is in a predetermined range of temperatures that is not suitable for making the beverage by the interaction, activate the pump to realize a first flow rate of the extracting fluid to effect production on the pressure-sensitive valve assembly of a first pressure within the first predetermined range, thereby diverting extracting fluid away from the chamber; and
  when the measured temperature is in a predetermined range of temperatures that is suitable for making the beverage by the interaction, activate the pump to realize a second flow rate of the extracting fluid to effect production on the pressure-sensitive valve assembly of a second pressure within the second predetermined range, thereby delivering extracting fluid to the chamber, wherein the second flow rate is different from the first flow rate.

19. The apparatus of claim 18, wherein the first outlet is open and the second outlet is closed at a default position of the pressure-sensitive valve assembly.

20. The apparatus of claim 18, further comprising a tube downstream of the heater, wherein the tube is configured to transfer heat from the extracting fluid flowing through the tube to the chamber.

21. An apparatus for making a beverage by interaction between a beverage extract and an extracting fluid, the apparatus comprising:
  a chamber configured to receive a quantity of the beverage extract;
  a heater arranged upstream of the chamber and configured to establish a predetermined temperature of the extracting fluid;
  a valve arrangement including:
    an inlet operably connected to the heat exchanger and configured to receive the extracting fluid;
    a first outlet operably connected to a first pathway and configured to deliver received extracting fluid to a part other than the chamber;
    a second outlet coupled to a second pathway and configured to deliver received extracting fluid to the chamber;
    a pressure-sensitive valve assembly configured to enable passage of fluid from the inlet and through the first outlet only when the pressure of the received fluid is within a first predetermined range, and configured to enable passage of fluid from the inlet and through the second outlet only when the pressure of the received fluid is within a second predetermined range different from the first predetermined range;
  a tube between the heater and the inlet, wherein the tube is configured to transfer heat to the chamber from the extracting fluid flowing through the tube;
  a temperature sensor configured to measure temperature of the extracting fluid at a position along a flow path between the heat exchanger and the valve arrangement;
  a pump operably connected to the heat exchanger and configured to supply the extracting fluid to the valve arrangement; and
  a controller operably connected to the temperature sensor and to the pump and configured to:
    activate the pump to realize a first flow rate of the extracting fluid to effect production on the pressure-sensitive valve assembly of a first pressure within the first predetermined range, thereby delivering extracting fluid to the part other than the chamber through the first outlet;
    activate the pump to realize a second flow rate of the extracting fluid to effect production on the pressure-sensitive valve assembly of a second pressure within the second predetermined range, thereby delivering extracting fluid to the chamber through the second outlet, wherein the second flow rate is different from the first flow rate;
    when the measured temperature is in a predetermined range of temperatures that is not suitable for making the beverage by the interaction, activate the pump to realize the first flow rate of the extracting fluid to effect the production on the pressure-sensitive valve assembly of the first pressure within the first predetermined range, thereby delivering the extracting fluid to the part other than the chamber; and
    when the measured temperature is in a predetermined range of temperatures that is suitable for making the beverage by the interaction, activate the pump to realize the second flow rate of the extracting fluid to effect the production on the pressure-sensitive valve assembly of the second pressure within the second predetermined range, thereby delivering the extracting fluid to the chamber.

* * * * *